United States Patent [19]

Arimura et al.

[11] Patent Number: 5,349,479
[45] Date of Patent: Sep. 20, 1994

[54] DATA TRANSFER METHOD OF MAGNETIC RECORDING/REPRODUCING APPARATUS

[75] Inventors: Noriji Arimura; Tatsumaro Yamashita, both of Shibata, Japan

[73] Assignee: Alps Electric Co., Ltd., Tokyo, Japan

[21] Appl. No.: 210,103

[22] Filed: Mar. 16, 1994

Related U.S. Application Data

[63] Continuation of Ser. No. 839,546, Feb. 19, 1992, abandoned.

[30] Foreign Application Priority Data

Feb. 20, 1991 [JP] Japan .................................. 3-077383

[51] Int. Cl.⁵ .............................................. G11B 5/09
[52] U.S. Cl. .................................. 360/73.06; 360/70; 360/75; 360/77.13
[58] Field of Search ........................ 360/46, 51, 61, 64, 360/75, 73.04, 73.05, 73.06, 77.13, 70

[56] References Cited

U.S. PATENT DOCUMENTS 4,872,073 10/1989 Fincher et al. .................... 360/51
4,942,487 7/1990 Noguchi et al. ............. 360/73.05 X

*Primary Examiner*—Michael Koczo
*Attorney, Agent, or Firm*—Guy W. Shoup; Patrick T. Bever

[57] ABSTRACT

A data transfer method of a magnetic recording/reproducing apparatus which makes it unnecessary to repeatedly stop and start a recording operation or a reproducing operation in spite of changes in transfer interval and density of data transmitted between a host computer and the magnetic recording/reproducing apparatus, and which shortens the waiting time of the host computer to a minimum. When data transferred from a host computer is stored in a buffer memory and then transmitted to a rotary head, the number of revolutions of the rotary head and the feeding speed of a magnetic tape are changed by a switch control portion based on the amount of data stored in the buffer memory and the rate at which the amount of data increases or decreases. It is thereby possible to perform continuous recording regardless of the amount and density of the transferred data. When data is reproduced from the magnetic tape by the rotary head and transferred to the host computer, the number of revolutions of the rotary head and the feeding speed of a magnetic tape are also changed based on the amount of data stored in the buffer memory and the rate at which the amount of data is increasing or decreasing.

3 Claims, 3 Drawing Sheets

DATA TRANSFER METHOD OF MAGNETIC RECORDING/REPRODUCING APPARATUS

This application is a continuation of application Ser. No. 07/839,546, filed Feb. 19, 1992, abandoned.

BACKGROUND OF THE INVENTION

1. Field of the Invention

The present invention relates to a data transfer method of a magnetic recording/reproducing apparatus which transfers data from a host computer and so on, and records the data by a magnetic recording/reproducing apparatus, or reproduces data by the magnetic recording/reproducing apparatus and transfers the data to the host computer and so on, and more particularly to a data transfer method capable of minimizing the stop time of the magnetic recording/reproducing apparatus or the waiting time of the host computer and so on even if the data transfer density varies.

2. Description Of the Related Art

Large-capacity memory devices, such as a hard disk device, have been popularized with the increase of the amount of data to be handled by computers. Such a kind of memory device needs a large-capacity recording medium for backup. Accordingly, there has been developed a magnetic recording/reproducing apparatus for achieving large-capacity data backup by using a magnetic tape substantially equivalent to a magnetic tape for a digital audio tape recorder (DAT).

When the recording/reproducing apparatus is used, for example, in the case of a recording operation, data transferred from a hard disk device built in or connected to a host computer 1 is stored in a buffer memory in a control device of a magnetic recording/reproducing apparatus 2 as shown in FIG. 5, recording data in a predetermined format is created based on the data recorded in the buffer memory, and recorded on a magnetic tape by a rotary head. In a normal constant speed mode of a magnetic recording/reproducing apparatus using a magnetic tape for a DAT, the number of revolutions of a rotary head having a diameter of 30 mm is 2000 rpm and the feeding speed of the magnetic tape is 8.15 mm/s.

The transfer speed of data reproduced from the hard disk device and transferred from the host computer does not always agree with the data recording speed in the aforementioned constant speed mode of the magnetic recording/reproducing apparatus of the rotary head type. Furthermore, it is assumed that the data transfer is intermittent and that the data transfer density is not constant. FIG. 6(A) illustrates the density and transfer time of data transferred from the host computer 1 with respect to the time axis. The data transfer density is divided into three levels, high density, medium density and low density as shown in patterns (a), (b) and (c), respectively.

As shown in FIG. 6(A), if the rotary head has a diameter of 30 mm, data which is transferred from the host computer 1 intermittently and in different transfer densities, are conventionally recorded in a constant speed mode in which the number of revolutions of the rotary head is 2000 rpm and the feeding speed of the magnetic tape is 8.15 mm/s. Therefore, it is necessary to perform recording only while the transferred data is stored in a buffer memory and sent out to the mechanism portion of the magnetic recording/reproducing apparatus, and to stop the operation of the mechanism portion when the data in the buffer memory runs out. The recording operation in the constant speed mode is therefore intermittent as shown in FIG. 6(B). Thus, the magnetic recording/reproducing apparatus repeatedly stops and starts up. The number of repetitions is almost the same as the number of transfer times of data from the host computer.

Such repetition of start and stop of the magnetic recording/reproducing apparatus hastens the wear and fatigue of the mechanism. Furthermore, in the case of an actual magnetic recording/reproducing apparatus, since the approach run of the magnetic tape and the search for the record leading end of the magnetic tape are needed when the apparatus is restarted after it is stopped, the control of the mechanism is complicated. When such operations are repeated, the damage to the magnetic tape as well as the fatigue of the mechanism is accumulated.

This problem also arises in the case where data is reproduced from the magnetic recording/reproducing apparatus and transferred from the host computer to a hard disk device or the like. In other words, the data receiving speed of the host computer does not always agree with the data reproducing speed of the magnetic recording/reproducing apparatus. In this case, when the data receiving operation in the host computer is stopped, it is necessary to stop the magnetic recording/reproducing apparatus at the time where the data amount in the buffer memory of the apparatus is increased to a maximum. In the case where the process speed is high as in recent computers, the reproducing speed of the magnetic recording/reproducing apparatus cannot come up with the receiving speed of the host computer. Therefore, it is sometimes required to make the receiving of the host computer on standby.

In order to solve the above problem arising from the repetition of start and stop of the magnetic recording/reproducing apparatus, for example, the recording operation of the magnetic recording/reproducing apparatus is not stopped when the data shown in FIG. 6(A) is intermittently transferred, and dummy data is recorded on a magnetic tape while the recording operation shown in FIG. 6(B) is stopped. This method makes it unnecessary to repeat the stop and start of the magnetic recording/reproducing apparatus, and enables a continuous recording operation. However, the memory capacity of the data on the magnetic tape is reduced by the amount of the dummy data. Furthermore, the recording area of the dummy data is uselessly read in reproduction, and thus the operational efficiency is lowered.

SUMMARY OF THE INVENTION

The present invention aims to solve the above problems of the prior art, and it is an object of the present invention to provide a data transfer method of a magnetic recording/reproducing apparatus which makes it unnecessary to repeat the stop and start of a recording operation or a reproducing operation in spite of changes in data transfer interval and density, or to set a waiting time in a host computer, and to record dummy data, and enhances the drive efficiency of the magnetic recording/reproducing apparatus.

There is provided a data transfer method of a magnetic recording/reproducing apparatus according to the present invention which has a function for changing the number of revolutions of a rotary head of the magnetic recording/reproducing apparatus and the feeding speed of a magnetic tape in accordance with the number of revolutions by a plurality of steps, and which switches the number of revolutions of the rotary head and the feeding speed of the magnetic tape in accordance with the amount of data transmitted to or from the magnetic recording/reproducing apparatus.

The above function switches the number of revolutions of the rotary head of the magnetic recording/reproducing apparatus and the feeding speed of the magnetic tape in accordance with the amount of data reproduced and transferred from a hard disk or the like. For example, if the transferred data is stored in a buffer memory and then sent to a recording head, the number of revolutions of the rotary head and the feeding speed of the magnetic tape are changed based on the amount of data stored in the buffer memory and the rate at which the amount of data in the buffer memory is increasing or decreasing. When the amount of data in the buffer memory is low and the rate of decrease of the data in the buffer memory is high, the number of revolutions of the rotary head is reduced, and the feeding speed of the magnetic tape is also reduced in accordance with the reduction of the number of revolutions. To the contrary, when the amount of data stored in teh buffer memory and the rate at which the amount of data is increasing are high, the number of revolutions of the rotary head and the feeding speed of the magnetic tape are increased. This makes it possible to perform continuous recording in the magnetic recording/reproducing apparatus and to reduce the number of repetitions of the start and stop of the mechanism portion. Furthermore, if data is reproduced from the magnetic tape by the rotary head and transferred to the host computer, for example, the data read from the magnetic tape is stored in the buffer memory and transferred from the buffer memory. At this time, the number of revolutions of the rotary head and the feeding speed of the magnetic tape in the magnetic recording/reproducing apparatus are also changed in accordance with the amount of data stored in the buffer memory and the rate at which the amount of data in the buffer memory is increasing or decreasing. It is thereby possible to reduce the number of repetitions of start and stop of the mechanism portion and to shorten the waiting time of the host computer.

DESCRIPTION OF THE PREFERRED EMBODIMENT

A preferred embodiment of the present invention will now be described with reference to FIGS. 1 to 4.

Figure 1:
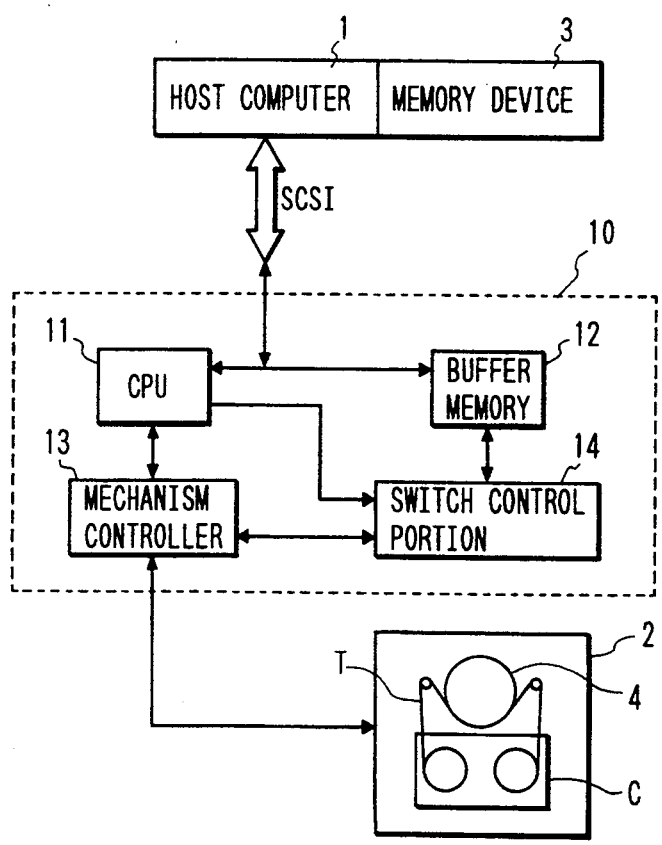
FIG. 1 is a block diagram of an embodiment of a magnetic recording/reproducing apparatus for carrying out the present invention.

FIG. 1 is a block diagram showing the construction of an apparatus.

Referring to FIG. 1, reference numerals 1 and 2 denote a host computer and a mechanism portion of a magnetic recording/reproducing apparatus having a rotary head 4. A cassette pack C is loaded into the mechanism portion 2, and a magnetic tape T drawn out of the cassette pack C is wound around the rotary head 4 and fed by a capstan. Data is exchanged through a small computer system interface (SCSI) bus between a control device 10 built in or disposed next to the magnetic recording/reproducing apparatus and the host computer 1.

The control device 10 is composed of a CPU 11, a buffer memory 12 for storing data transferred through the SCSI bus or data reproduced by the rotary head 4 in the mechanism portion 2, and a mechanism controller 13 for controlling the operations of components in the mechanism portion 2. Furthermore, the control device 10 has a switch control portion 14 for switching the number of revolutions of the rotary head 4 in the mechanism portion 2, the feeding speed of the magnetic tape T, and the sampling frequency to record and reproduce data by a plurality of steps.

Figure 2:
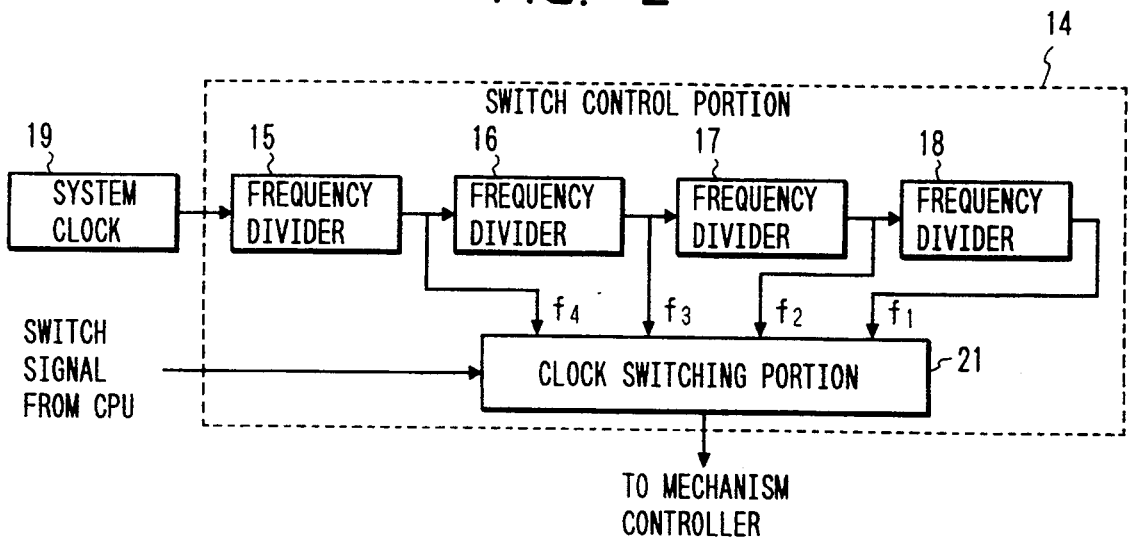
FIG. 2 is a block diagram of the specific construction of a switch control portion shown in FIG. 1.

FIG. 2 shows an example of the construction of the switch control portion 14.

The switch control portion 14 is provided with four frequency dividers 15, 16, 17 and 18. A system clock 19 obtained from an oscillator disposed in the control device 10 is divided, thereby obtaining four sampling frequencies $f_1$, $f_2$, $f_3$ and $f_4$. The frequency $f_1$ is, for example, 48 kHz. When the frequency $f_1$ is selected, the mechanism portion 2 is put into a constant speed mode, and the number of revolutions of the rotary head 4 having a diameter of 30 mm and the feeding speed of the magnetic tape T are set at 2000 rpm and 8.15 mm/s, respectively. The frequency $f_2$ is, for example, 24 kHz. When the frequency $f_2$ iS selected, the mechanism portion 2 is put into a half speed mode, and the number of revolutions of the rotary head 4 and the feeding speed of the magnetic tape T are set at 1000 rpm and 4.075 mm/s, respectively. At this time, the speed of data transmitted to a magnet head disposed in the rotary head 4 is the half of that in the constant speed mode in accordance with the sampling frequency $f_1$. The frequency $f_4$ is 96 kHz. When the frequency $f_4$ is selected, the mechanism portion 2 is put into a double speed mode, and the number of revolutions of the rotary head 4 and the feeding speed of the magnetic tape T are set at 4000 rpm and 16.3 mm/s, respectively. At this time, the speed of data transmitted to the magnet head is the double of that in the constant speed mode. The frequency $f_3$ is 72kHz. When the frequency $f_3$ is selected, the mechanism portion 2 is put into a 3/2-times speed mode, and the number of revolutions of the rotary head 4 and the feeding speed of the magnetic tape T are set at 3000 rpm and 12.225 mm/s, respectively. At this time, the speed of data transmitted to the magnet head is 3/2 of that in the constant speed mode.

One of the frequencies $f_1$, $f_2$, $f_3$ and $f_4$ is selected by switching a clock switching portion 21 in response to a command from the CPU 11, and sent to the mechanism controller 13. In the mechanism controller 13, the number of revolutions of the rotary head 4 and the feeding speed of the magnetic tape T (the number of revolutions of the capstan) are determined in accordance with the selection of the frequency. Recording data is formatted by a recording data creating portion disposed in the mechanism controller 13 or the control device 10 while using one of the frequencies $f_1$, $f_2$, $f_3$ and $f_4$ as a reference frequency. The same operation as above is performed in a reproducing data creating portion.

Data recorded on the magnetic tape in the constant speed mode, the half speed mode, the double speed mode and the 3/2-times mode by the switching of the frequencies are interchangeable and can be reproduced in any of the modes.

The recording operation will now be explained.

Figure 3:
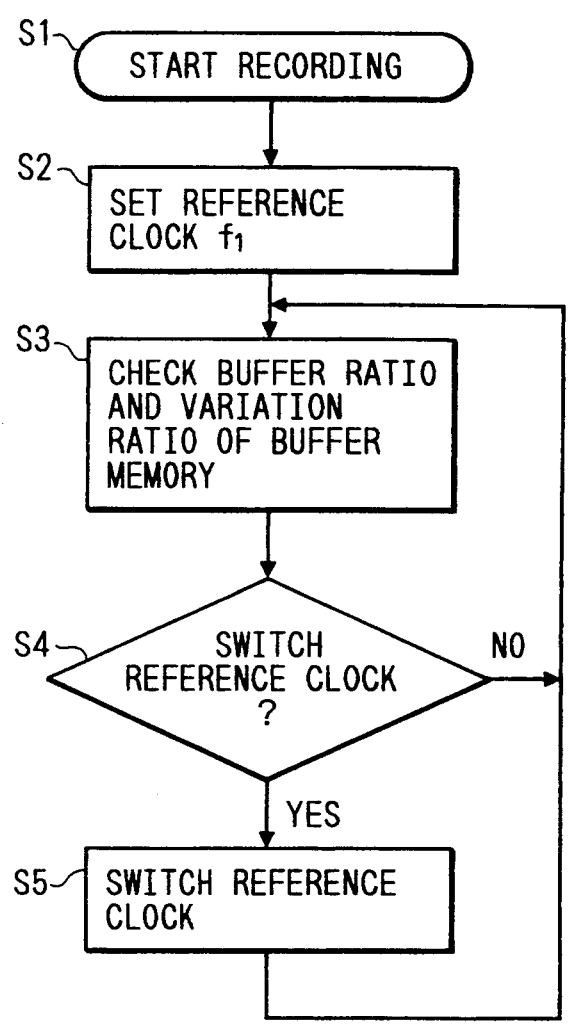
FIG. 3 is a flow chart of a recording operation.

FIG. 3 is a flow chart of the recording operation. When the recording operation is started (Step S1), the frequency $f_1$ is selected by the clock switching portion 21 of the switch control portion 14, and the constant speed mode of the mechanism portion 2 is set by the mechanism controller 13 (Step S2). Then, the rotary head 4 of the mechanism portion 2 is rotated at 2000 rpm and the magnetic tape T is driven at 8.15 mm/s. In the recording operation of the constant speed mode, data read from the memory device 3, such as a hard disk, is transferred from the host computer 1 through the SCSI bus, and stored in the buffer memory 12. The data is read from the buffer memory 12, formatted by the recording data creating portion disposed in the mechanism controller 13 or the control device 10 in accordance with the sampling frequency $f_1$, transmitted to the magnet head of the rotary head 4, and recorded on the magnetic tape T in a helical scanning method. Meanwhile, the data transferred through the SCSI bus is stored in the buffer memory 12. In Step S3 shown in FIG. 3, (i.e., the ratio of the stored data to the storage capacity of the buffer memory 12 and the variation ratio (i.e., the rate of increase or decrease of the data in the buffer memory 12 are checked in the CPU 11, calculation is performed based on the check result, and it is judged whether to switch the recording mode. If it is judged in Step S4 that the mode switching is necessary, a frequency switch command is given to the clock switching portion 21 in Step S5, and the frequency $f_1$ is switched to the other one. In response to this switching, the mechanism portion 2 is put into the half speed mode, the double speed mode or the 3/2-times speed mode.

Figure 4:
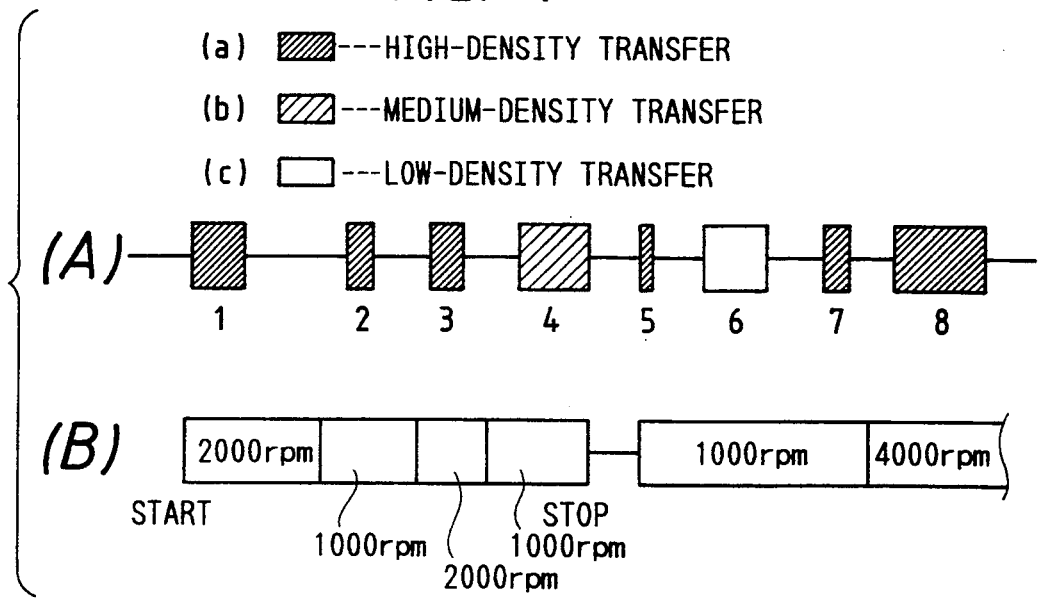
FIG. 4(A) is a diagram showing the transfer state of data in the recording operation.
FIG. 4(B) is a diagram showing the recording operation.
Figure 5:
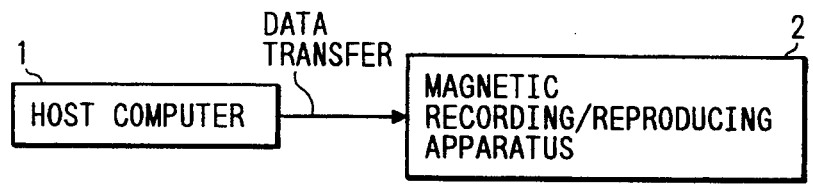
FIG. 5 is a block diagram explaining the data transfer state when a magnetic recording/reproducing apparatus is used for backup.
Figure 6:
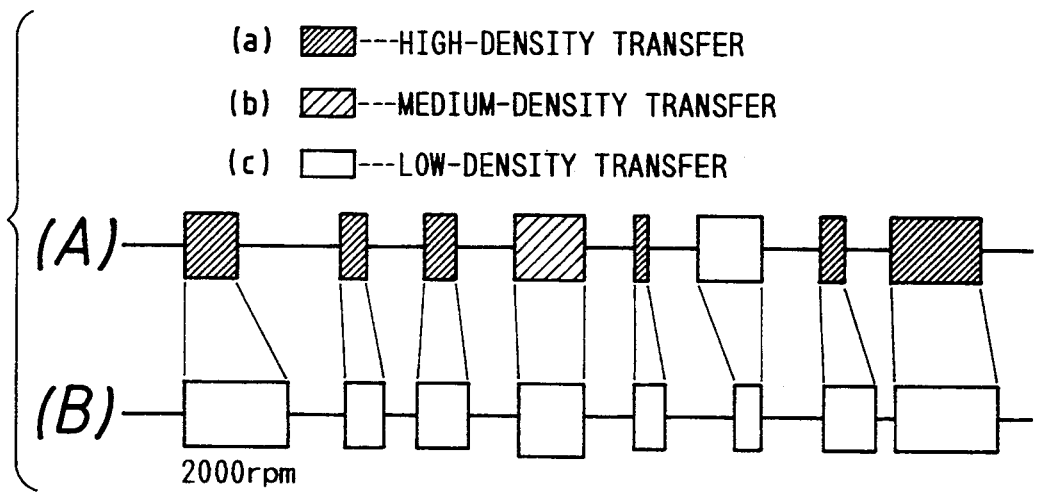
FIG. 6(A) is a diagram showing the transfer state of data in the apparatus shown in FIG. 5.
FIG. 6(B) is a diagram showing a recording operation of the apparatus.

FIG. 4 (A) shows the amount of data transferred from the host computer 1. Patterns (a), (b) and (c) designate the densities of the transferred data, that is, high density, medium density and low density, respectively.

FIG. 4(B) expresses the operation modes of the mechanism portion 2 in the number of revolutions of the rotary head 4.

Referring to FIG. 4(A), the first data is transferred in high density. Although the buffer ratio of the buffer memory 12 increases in a short time, there is much interval between the first and second data transfers. Therefore, the rate of decrease of the amount of data in the buffer memory 12, when the first data stored in the buffer memory 12 is transmitted to the mechanism controller 13, is relatively high. Thus, the operation mode of the mechanism portion 2 is fixed to the constant speed mode in which the number of revolutions of the rotary head 4 is 2000 rpm. Then, although the second data is transferred in high density and stored in the buffer memory 12, since the amount of the data is small and there is much time before the third data is transferred, the buffer ratio of the buffer memory 12 is not high and data recording is finished quickly. Therefore, it is judged in Step S4 that it is necessary to switch the clock in this case, the frequency is switched to $f_2$ by the clock switching portion 21 shown in FIG. 2, and the mechanism portion 2 is set to the half speed mode in which the rotary head 4 is rotated at 1000 rpm. When the third high-density data is stored in the buffer memory 12, since the buffer ratio is increased, the frequency is switched to $f_1$ and the mechanism portion 2 is returned to the constant speed mode in Step S3 shown in FIG. 3. Since the fourth data is transferred in medium density, the increase ratio of the data in the buffer memory 12 is low. Thus, the frequency is switched to $f_2$, and the mechanism portion 2 is switched to the half speed mode again. In the case shown in FIG. 4, the mechanism portion 2 is stopped after the recording of the fourth data is completed.

Since the fifth short data is transferred in high density and the sixth data is transferred in low density, the mechanism portion 2 is switched to the half speed mode. Subsequently, since the seventh and eighth data are transferred in high density, the mechanism portion 2 is driven in the double speed mode.

The stop time of the mechanism portion 2 is shortened to a minimum by switching the operation mode of the mechanism portion 2 in accordance with the buffer ratio of the buffer memory and the variation ratio of the data. Furthermore, since recording on the magnetic tape T is continued in the same condition, the tape T is prevented from being wasted.

The reproducing operation will now be described. The recording state of the data recorded on the magnetic tape as shown in FIG. 4 is the same as that of continuous recording in the constant speed mode. When the magnetic tape on which the data is thus continuously recorded (including magnetic tapes on which recording is performed apparatuses other than the apparatus shown in FIG. 1) is reproduced by the apparatus shown in FIG. 1, the frequency is set at $f_1$, reproduction is performed in the constant speed mode, and the data read from the magnetic tape T is stored in the buffer memory 12. Then, the data is transferred from the buffer memory 12 to the host computer 1 through the SCSI bus in response to a command from the CPU 11, and stored in the memory device 3, such as a hard disk device. At this time, the reproduction speed of the mechanism portion 2 sometimes does not agree with the data transfer speed in relation to the process state of the host computer 1, the recording speed of the memory device 3 and so on. When the mechanism portion 2 is set in only the constant speed mode as before, it is sometimes stopped and put into a standby state. Since the process speed of a present computer is higher as before, if the reproduction is performed in the constant speed mode, it is necessary to stop the host computer 1 and the memory device 3 and make them on standby for a while. However, in this embodiment, the switching of frequency shown in FIG. 2 and so on are performed in accordance with the buffer ratio and the variation ratio of the data in the buffer memory 12 when the data is transferred from the buffer memory 12 to the host computer 1, and the mechanism portion 2 during the reproduction is switched to the half speed mode or the double speed mode. Accordingly, it is possible to remove the stop time of the mechanism portion 2 and the waiting time of the host computer 1 and thus to efficiently process the data.

Although the mechanism portion 2 is switched to the four operation modes in the illustrated embodiment, it may be switched to only two modes, for example, the constant speed mode and the double speed mode.

Although the operation mode of the mechanism portion 2 is switched in accordance with the buffer ratio of the buffer memory 12 and the variation ratio of the stored data in the above embodiment, other methods may be used, for example, the amount of transferred data through the SCSI bus may be detected by an I/O portion. Furthermore, although the sampling frequencies are determined by dividing the system clock and the operation mode of the mechanism portion 2 is switched according to the sampling frequencies in the embodiment shown in FIG. 2, other switching methods may be adopted.

According to the present invention described in detail above, it is possible to prevent the repetition of stop and start of the mechanism portion in a recording or reproducing operation, and to restrict fatigue of the mechanism portion and damage to the tape. In addition, the stop time of the mechanism portion and the waiting time of the host computer can be shortened to a minimum in reproduction, thereby enhancing data process efficiency.

What is claimed is:

1. A method of transferring data to a magnetic tape recording/reproducing apparatus, the apparatus including a buffer memory for storing data and a read/write head mounted on a rotating drum for writing data from the buffer memory onto the magnetic tape, the read/write head being rotated by the rotating drum at a head rotating speed, the magnetic tape being driven over the rotating drum at a tape driving speed, the method comprising the steps of:

determining an amount of data stored in the buffer memory;

determining a rate at which the amount of data stored in the buffer is increasing or decreasing; and changing a rate at which data is written on the magnetic tape by selecting between a plurality of predetermined head rotating speeds and tape driving speeds in response to the determined amount of data and the determined rate of storage.

2. The method of claim 1 wherein the magnetic tape recording/reproducing apparatus includes a plurality of frequency dividers connected in series to an oscillator, each of the frequency dividers receiving an input frequency from one of the oscillator or a previous frequency divider, and generating an output frequency which is one-half of the input frequency;

wherein the step of changing the rate at which data is written on the magnetic tape comprises selecting the output frequency generated by one of the frequency dividers.

3. A method of transferring data from a magnetic tape recording/reproducing apparatus, the magnetic tape apparatus including a buffer memory for storing data and a read/write head mounted on a rotating drum for writing data from the buffer memory onto the magnetic tape, the read/write head being rotated by the rotating drum at a head rotating speed, the magnetic tape being driven over the rotating drum at a tape driving speed, the apparatus further including a plurality of frequency dividers connected in series to an oscillator, each of the frequency dividers receiving an input frequency from one of the oscillator or a previous frequency divider, and generating an output frequency which is one-half of the input frequency, the method comprising the steps of:

determining an amount of data stored in the buffer memory;

determining a rate at which the amount of data stored in the buffer is increasing or decreasing; and changing a rate at which the data is reproduced from the magnetic tape by selecting between a plurality of predetermined head rotating speeds and tape driving speeds in response to the determined amount of data and the determined rate of storage;

wherein the step of changing the rate at which data is reproduced from the magnetic tape comprises selecting the output frequency generated by one of the frequency dividers.

* * * * *